No. 701,468. Patented June 3, 1902.

A. CLAUSING.
STOVEPIPE.
(Application filed Jan. 13, 1902.)

(No Model.)

WITNESSES
Walter Allen
Geo. C. Ponleton

INVENTOR
Albert Clausing.
by Herbert W. T. Jenner,
Attorney

THE NORRIS PETERS CO., PHOTO-LITHO., WASHINGTON, D. C.

UNITED STATES PATENT OFFICE.

ALBERT CLAUSING, OF MILWAUKEE, WISCONSIN.

STOVEPIPE.

SPECIFICATION forming part of Letters Patent No. 701,468, dated June 3, 1902.

Application filed January 13, 1902. Serial No. 89,560. (No model.)

*To all whom it may concern:*

Be it known that I, ALBERT CLAUSING, a citizen of the United States, residing at Milwaukee, in the county of Milwaukee and State of Wisconsin, have invented certain new and useful Improvements in Stovepipes; and I do hereby declare the following to be a full, clear, and exact description of the invention, such as will enable others skilled in the art to which it appertains to make and use the same.

This invention relates to stovepipes; and it consist in constructing the pipe with a peculiar pocket or auxiliary fold at one end, as hereinafter fully described and claimed, so that the pipe may be circular in form and may be locked in its completed shape without any longitudinal movement or distortion.

Figure 1:
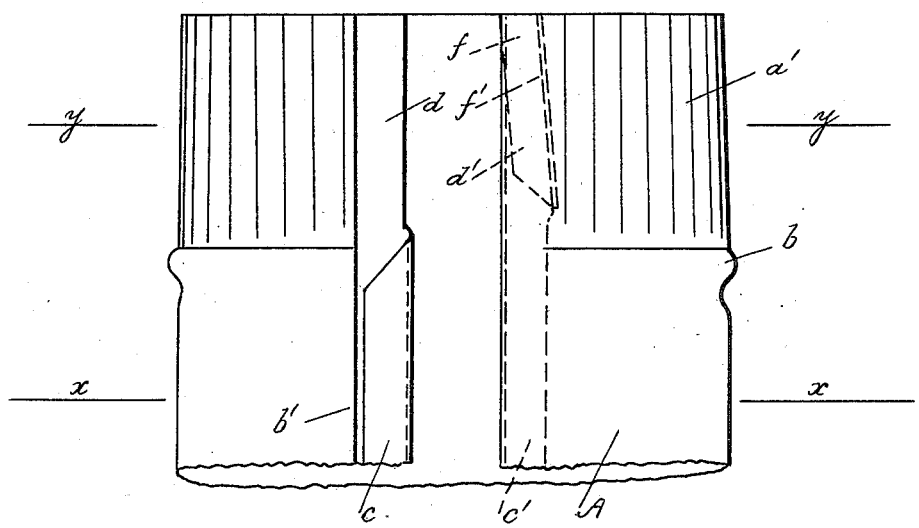
Figure 2:
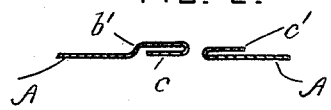
Figure 3:
Figure 4:
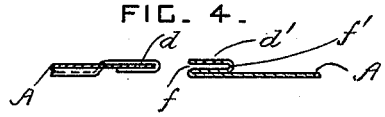
Figure 5:
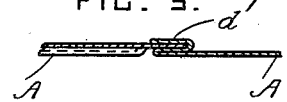
Figure 6:
Figure 7:
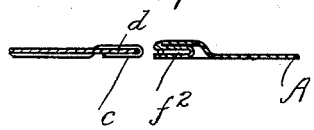

In the drawings, Figure 1 is a side view of one end portion of a stovepipe constructed according to this invention and showing the parts disengaged. Figs. 2 and 3 are cross-sections through the main locking-fold, taken on the line $x\ x$ in Fig. 1 and showing the parts disengaged and put together, respectively. Figs. 4 and 5 are cross-sections through the pocket or auxiliary locking-fold, taken on the line $y\ y$ in Fig. 1 and showing the parts disengaged and put together, respectively. Figs. 6 and 7 are cross-sections taken on lines similar to $y\ y$ and showing modifications.

A is one end portion of a stovepipe, which is crimped at $a'$, where it fits into the next pipe-section, and $b$ is a bead arranged behind the crimped portion in the usual manner. The opposed edges of the pipe are provided with interlocking hook-shaped flanges, hooks, or folds $c\ c'$ for connecting them together for the greater part of their length in the usual manner. In order that the pipe may be substantially circular externally when in its complete form, one edge of it is provided with an offset portion $b'$, which extends the full length of the pipe. In Fig. 1 this offset portion $b'$ is on the edge of the pipe, from which the hook $c$ projects outwardly, and which is overlapped by the hook $c'$ when the pipe is put together.

At the crimped end portion of the pipe beyond the bead $b$ one edge $d$ of the pipe is blank and has no flange or hook upon it, and the opposed edge has an auxiliary flange or fold $d'$. The flange $d'$ is formed by bending the metal at the edge of the plate twice upon the plate. The first lap or fold is bent inward and is a continuation of the hook $c'$; but it is pressed close against the interior of the pipe instead of standing clear of it to form a hook. The second lap or fold is bent outward over the first lap, leaving a space or pocket $f$ between the two laps. The bottom $f'$ of this pocket is arranged at a slight angle with respect to the edge of the pipe.

In putting the pipe together the edge $d$ is pressed into the pocket $f$ and the hook $c'$ is moved over the hook $c$, the inclined bottom $f'$ of the pocket $f$ permitting this motion. The hook $c'$ is then slipped into engagement with the hook $c$ without moving the edges of the pipe longitudinally with respect to each other. The hooks $c\ c'$ interlock and are held in position by the elasticity of the metal of the pipe.

The pipe is substantially cylindrical externally for its full length and has no objectionable external projections. The diameter of the crimped end of the pipe is accurately determined by the auxiliary fold, which is a very great advantage in putting pipe-sections together telescopically, as it enables tight joints to be formed.

In the modification shown in Fig. 6 the offset portion $b^2$ is formed on the edge of the pipe which carries the hook $c'$ instead of being formed on the edge which carries the hook $c$, like the offset portion $b'$ shown in Fig. 1; but otherwise there is no change in the two constructions.

In the modification shown in Fig. 7 the pocket $f^2$ is formed on the outside of the pipe instead of on its inside, the first lap being bent outwardly instead of inwardly; but otherwise the construction is the same as hereinbefore described.

What I claim is—

1. A pipe-section provided at its edges with interlocking hook-shaped flanges, one edge being without any flange at one end and the opposed portion of the pipe being provided with a pocket having an inclined bottom for receiving the said blank portion of the opposed edge and permitting the said hook-shaped flanges to be interlocked without longitudinal movement, substantially as set forth.

2. A pipe-section provided at its edges with interlocking hook-shaped flanges and provided also upon one edge with an offset portion extending longitudinally behind one of the said flanges, one edge of the said pipe being without any flange at one end and the opposed portion of the pipe being provided with a pocket having an inclined bottom for receiving the said blank portion of the opposed edge, substantially as set forth.

3. A pipe-section provided at its edges with interlocking hook-shaped flanges $c$ $c'$ and an offset portion $b'$ extending longitudinally behind the flange $c$, one edge being without the said flange $c$ at one end and the opposed edge being provided with a pocket $f$ having an inclined bottom $f'$ for engaging with the said blank portion of the pipe, said pocket $f$ being formed between two folds of the metal and upon the inside of the pipe, substantially as set forth.

In testimony whereof I affix my signature in presence of two witnesses.

ALBERT CLAUSING.

Witnesses:
E. P. STUETZEL,
A. C. RUNKEL.